United States Patent [19]

Holm et al.

[11] 4,429,184

[45] Jan. 31, 1984

[54] MITIGATION OF FAULTS IN A TELEPHONE EXCHANGE

[75] Inventors: Per I. Holm, Alta; Karl F. L. Nyberg, Tyresö; Ulf Å. Södermark, Huddinge, all of Sweden

[73] Assignee: Telefonaktiebolaget L M Ericsson, Stockholm, Sweden

[21] Appl. No.: 316,271

[22] Filed: Oct. 29, 1981

[30] Foreign Application Priority Data

Nov. 6, 1980 [SE] Sweden ............................. 8007825

[51] Int. Cl.³ .................... G06F 11/00; H04Q 1/22
[52] U.S. Cl. .............................. 179/18 EE; 364/184
[58] Field of Search ......... 179/18 EE, 27 G, 175.2 C; 371/12; 364/184, 186

[56] References Cited

U.S. PATENT DOCUMENTS 3,286,239 11/1966 Thompson et al. ............. 371/12 X

FOREIGN PATENT DOCUMENTS 2072381 9/1981 United Kingdom ............... 364/184

0018359 2/1978 Japan ............................ 371/12

OTHER PUBLICATIONS

"Stored Program Multiregister Control Software", Bacete et al., *Electrical Communication*, vol. 54, No. 4, 1979, pp. 281-291.

*Primary Examiner*—Thomas W. Brown
*Attorney, Agent, or Firm*—Hane, Roberts, Spiecens & Cohen

[57] ABSTRACT

Mitigation of faults in a telephone exchange, the faults being in the form of interruptions in calls in progress caused by brief voltage drops or failure of the AC voltage supply to the exchange. Failure of the AC supply, or a voltage drop in the stabilized Dc voltage is detected, and causes interruption of the program execution in the exchange. Depending on whether the fault has a duration greater or less than a given time, either all connections set up are released, or the connection state for the time before the occurrence of the fault is set up again.

1 Claim, 2 Drawing Figures

MITIGATION OF FAULTS IN A TELEPHONE EXCHANGE

TECHNICAL FIELD

The present invention relates to the mitigation of faults in a telephone exchange, the faults being in the form of interruptions in calls in progress caused by brief voltage drops or failures of the supply to the exchange.

BACKGROUND ART

Both public and private conventional telephone exchanges are normally powered with direct voltage. Alternating voltage from the mains supply is rectified and the direct voltage utilized for charging batteries. The voltage to the exchange is taken from these batteries, possibly after DC/DC conversion.

The operation of the exchange is thus ensured for a certain time during an interruption in the AC distribution. Such an arrangement also makes the exchange insensitive to transient-type disturbances coming from the mains supply, e.g., those caused by rapid load variations.

DISCLOSURE OF THE INVENTION

In smaller exchanges, primarily subscriber exchanges, it may sometimes be advantageous to avoid providing the exchange with batteries. An AC/DC converter then constitutes the current supply unit in its entirety. As a result of brief mains supply disturbances of the type mentioned, connections through the exchange can become disconnected and calls in progress be broken off.

The present invention proposes a solution to this problem and is thereby characterized as will appear from the appended claims.

The advantage with an arrangement in accordance with the invention is obviously that irritating interruptions in calls set up are avoided. The application of the method can at most generate an insignificant click, which is often entirely masked in the conversation in progress.

BRIEF DESCRIPTION OF DRAWING

The invention will now be described while referring to the accompanying drawing on which.

MODE FOR CARRYING OUT THE INVENTION

Figure 1:
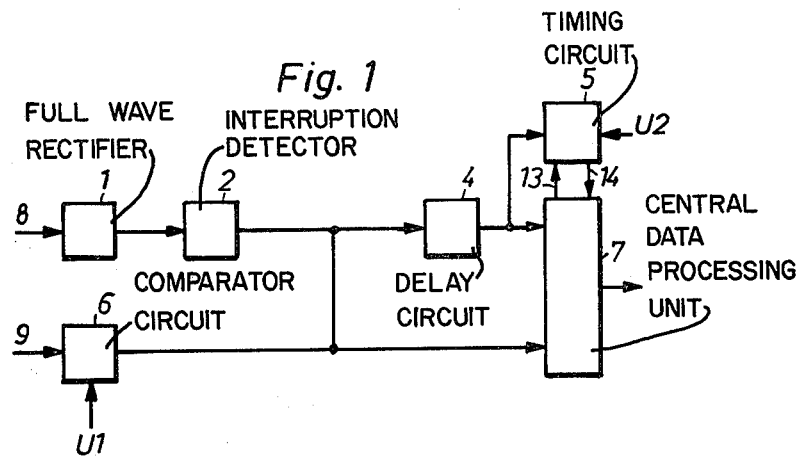
FIG. 1 illustrates an apparatus in accordance with the invention.

FIG. 1 illustrates an apparatus in accordance with the invention. The exchange is supplied with current from the mains supply, as mentioned above. An AC voltage is taken from the secondary side of a mains transformer, rectified, stabilized and filtered conventionally to provide the voltage supply for the electronic circuits in the exchange. This stabilized direct voltage is sensed on an input 9 to a comparator circuit 6, which also receives a reference voltage U1 on a second input. With a given margin, the voltage U1 corresponds to the lowest permitted operating voltge for the electronic circuits of the exchange. The output voltage of the comparator circuit can assume two values, indicating respectively that the direct voltage on input 9 is greater than the reference voltage, signifying that the electronic circuits of the exchange are getting sufficient operating voltage, and also that the voltage on input 9 is equal to or less than the reference voltage, signifying that the operating voltage has reached a critically low value.

The function of the exchange is assumed to be controlled by a central data processing unit, e.g., a microprocessor, and for executing the program of the exchange it coacts with a plurality of internal and external registers and memory units for storing data and programs. The microprocessor, registers and memory units as well as the rest of the electronic units in the exchange require a given lowest operating voltage for them to function reliably. If this lowest operational voltage is underpassed, practically anything can happen in the exchange logic circuits, including disconnection of speech paths set up, incorrect read and write functions in the memory units, etc.

The output from the comparator circuit 6 is connected to an interruption input on the central data processing unit 7. A change in signal level on this output, indicating the critical low voltage as above, is thus sensed by the unit 7. As a result thereof, the normal program execution in the exchange is interrupted and steps are taken, which are controlled from the unit 7, for storing away and "freezing" the information content in registers and memory units. The intention is thus to make the contents of these storing means inaccessible to incorrect write and read operations caused by incorrect operating voltage to the logic circuits.

The same output signal from the circuit 6 is also connected to the input on a delay circuit 4. The output from this is in turn connected to a second input on the data processing unit 7. By means of this arrangement, the unit 7 receives a second interruption signal, which finally interrupts all execution. The delay time is adjusted so that the work of storing data can be fulfilled.

The second interruption signal is further supplied to a first input on a timing circuit 5, readable from the unit 7 via a read signal input 13, this timing circuit 5 having a binary output 14. For a signal on the first input of the timing circuit, a voltage-time function is initiated in the timing circuit, e.g. a charging or discharging process in a capacitor. For a read signal on the input 13 the actual voltage is read and compared with a preset reference voltage U2 on a second input to the circuit 5. A binary signal is given on the output 14, and with its two levels it indicates that the time-variable voltage at the read instant is greater or less than the fixed reference voltage. In this way, the reference voltage U2 will be directly related to a time measured from the occurrence of the fault.

The interruption signal to the unit 7 ceases when the AC voltage once again returns to normal amplitude, and the stabilized DC voltage on the input 9 thus assumes the nominal value once again. It is first decided by a read signal on the input 13 and associated reply on the output 14 whether the interruption in question has longer or shorter duration than that corresponding to the set reference voltage U2, which in this example is of the order of magnitude of 100 ms.

According to the inventive concept, the result of this time measurement now decides which of two sequences of steps shall be taken, before normal program execution is again started in the exchange. If the fault has thus had a duration of less than 100 ms, steps are taken to reset the connection paths which were functioning when the fault occurred, and this is done with guidance from the stored-away information regarding the connection state at the time of the occurrence of the fault.

The exchange connection state at the time of the fault is thus recreated so rapidly that calls in progress are not disturbed at all in most cases.

On the other hand, if the fault has had a duration of more than 100 ms, all the set speech paths are released, and the subscribers must signal again from their telephone sets to set up a connection.

A full wave rectifier 1 is also connected by its input 8 to the secondary side of the mains transformer. The full wave rectified voltage is applied to an interruption detector 2, which very quickly detects direct failure in the AC mains supply. The interruption detector output is, in parallel with the output from the comparator circuit 6, connected to the delay circuit 4 and data processing unit 7. A signal on the detector output thus causes a sequence analogous with what has been described above.

Figure 2:
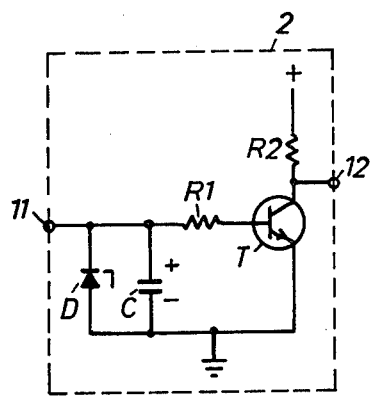
FIG. 2 illustrates an ambodiment of an interruption detector in accordance with the invention.

FIG. 2 illustrates an embodiment of the inventive interruption detector. The full wave rectified voltage is received on the terminal 11. This voltage charges a small capacitor C, and keeps it charged at a voltage equal to the Zener voltage for the parallel-connected diode D. Base voltage is taken from the capacitor via the resistor R1 to the transistor T, which is thus conductive in the normal case, and maintains a low voltage on its collector. The collector current is taken from a positive voltage source via a resistor R2. When an interruption occurs in the AC voltage, the voltage across the capacitor C already drops so much during the first half period after the interruption that the base current is not sufficient to keep the transistor conductive. When the transistor T is cut off, the output voltage on the terminal 12 is increased to the supply voltage for the transistor.

An interruption in the AC voltage supply to the exchange is thus already detected after a shorter time than half a period by the interruption detector, providing the detector is suitably dimensioned.

What we claim is:

1. In a telephone exchange which includes a stored program controlled central processing unit and a stabilized AC/DC converter for generating an operating voltage, a method of processing faults resulting from transient suspensions in the operating voltage comprising sensing for a suspension in the operating voltage, in response to such suspension interrupting the execution of the program being performed by the stored program controlled central processing unit, measuring the duration of the suspension; if the duration is less than a given time initiating a first control sequence and if the duration is greater than said given time, initiating a second control sequence by the central processing unit.

* * * * *